United States Patent Office 3,438,457
Patented Apr. 15, 1969

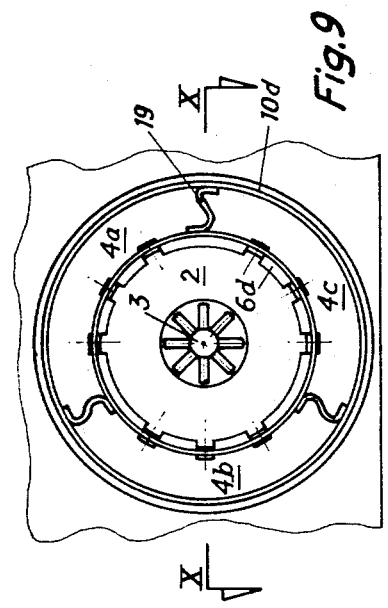
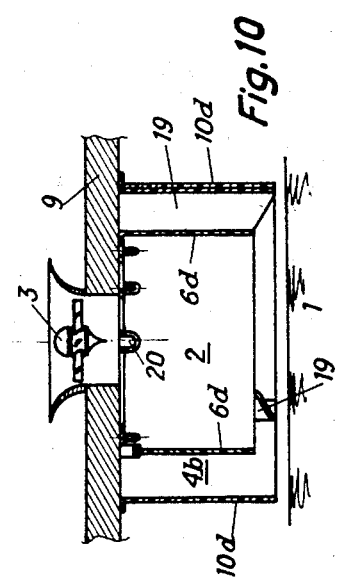
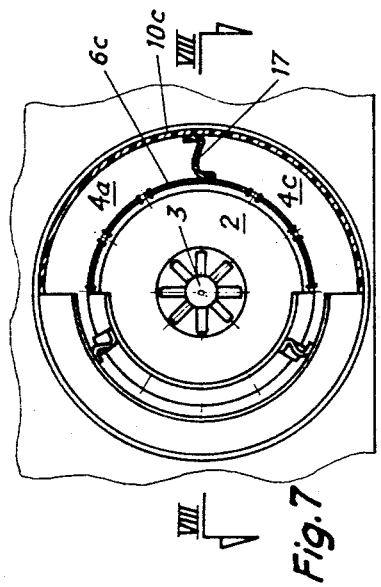
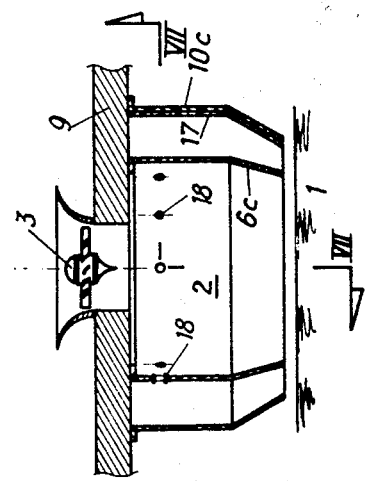

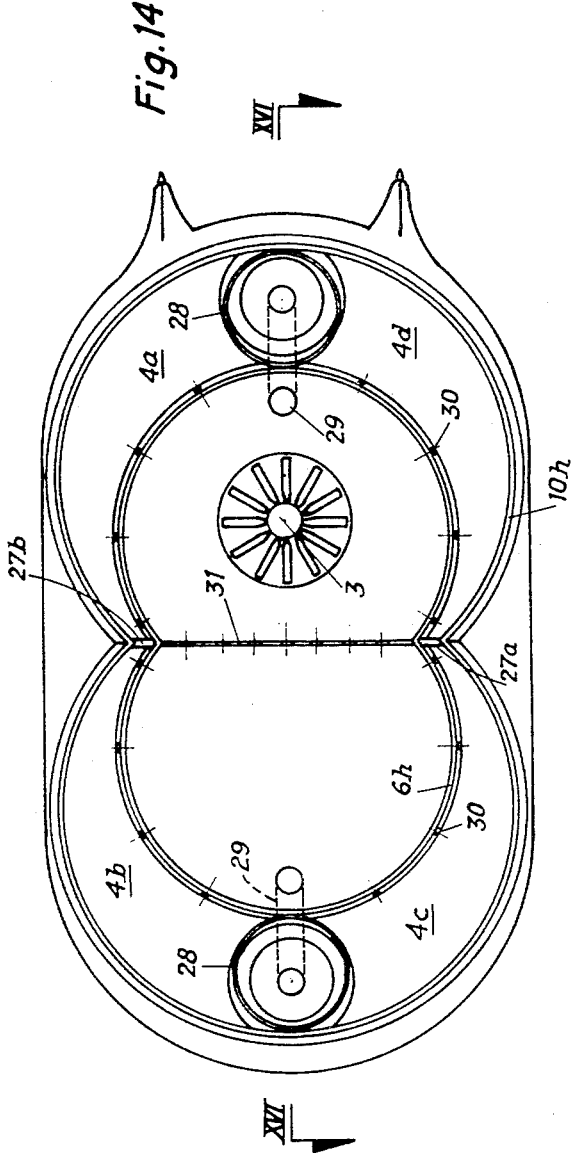
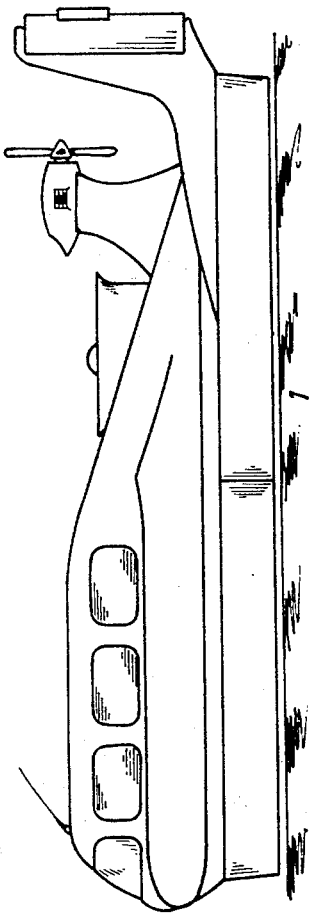
Fig.14
Fig.15

3,438,457
MULTI-CUSHION SYSTEM FOR A SURFACE EFFECT VEHICLE
Paul Francois Guienne, Paris, and Marc Henri Jean Faure, Saint-Maur-des-Fosses, France, assignors to Bertin & Cie, Plaisir, France, a company of France
Filed Jan. 30, 1967, Ser. No. 612,545
Claims priority, application France, Feb. 1, 1966, 48,031
Int. Cl. B60v 1/16
U.S. Cl. 180—121   17 Claims

ABSTRACT OF THE DISCLOSURE

A multi-cushion system bearing a ground effect machine and supplied with pressure fluid delivered by a same generator, comprising an inner primary cushion compartment bounded by an endless wall and fed with the whole delivery of said generator, said endless wall being surrounded by a further endless wall and bounding therewith an outer space which is divided into two or more outer secondary cushion compartments by means of partitions extending between said walls, said outer secondary cushion compartments being supplied with pressure fluid tapped from said inner primary cushion compartment through communicating passages between said compartments.

Background of the invention

This invention relates to ground effect platforms borne by pressure-gas cushions produced in multiple-chamber pressurised enclosures of the plenum chamber kind.

Summary of the invention

The invention provides in combination a first endless wall bounding a first cushion compartment which is supplied by a generator with pressure fluid, a second endless wall which extends around the first wall, and means for dividing the space between the two endless walls into at least two other cushion compartments, communications being provided between the first compartment and the other compartments so that the latter are supplied with pressure fluid from the first compartment to which all the supply fluid is delivered.

Various forms of interconnection between the various cushions are possible. For instance, the first wall can be formed with passages disposed at the top edge of the cushion. Alternatively, the first wall can be made of a porous substance whose pores provide the interconnection.

The cross-section of the intercommunicating orifices is preferably variable at will in order to control the pressure in the various compartments and to adjust the rolling and pitching moments which stabilise the platform. This leads to horizontal control and/or propulsive forces, the vehicle moving in the direction of the side having the compartment of lowest delivery.

Brief description of the drawings

FIGURE 7 is a partly sectioned inverted plan view of the third embodiment of the invention;

FIGURE 8 is a section on the line VIII—VIII of FIGURE 7;

FIGURE 9 is an inverted plan view of the fourth embodiment of the invention;

FIGURE 10 is a section on the line X—X of FIGURE 9;

FIGURE 14 is an inverted plan view of another embodiment of the invention;

FIGURE 15 is a side elevation of the apparatus shown in FIGURE 14 of the vehicle superstructure.

Description of the preferred embodiments

Figure 1:
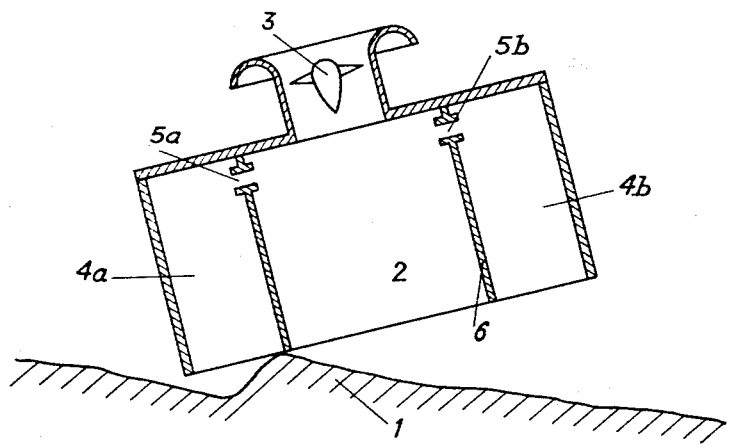
FIGURES 1 and 2 are views in diagrammatic section of a device comprising intercommunicating orifices which are of fixed dimensions in FIGURE 1 and of adjustable dimensions in FIGURE 2.

Referring to FIGURE 1, the vehicle, whose superstructure is not shown, is maintained above the ground 1 by lift device mainly comprising a central cushion 2, which a generator 3 supplied with air, and two outer cushions 4a, 4b around the central cushion 2. Cushion 4a is supplied with pressure fluid from the central cushion 2 through an orifice 5a, and cushion 4b is supplied with pressure fluid from the central cushion 2 through an orifice 5b. The orifices 5a, 5b are disposed at the top of the central cushion 2.

When the lifting device tends to tilt and takes up e.g. the position shown in FIGURE 1, the pressure in the cushion 4a becomes greater than the pressure in the cushion 4b since the leakage between cushions 4a and the ground is less than the leakage between cushion 4b and the ground. This pressure difference is produced because of the orifices 5a, 5b even if, as shown, the shape of the ground prevents the pressure fluid in the central cushion from passing to the cushion 4a around the bottom end of the endless wall 6 bounding the central cushion 2. The pressure increase in the cushion 4a and the pressure decrease in the cushion 4b produce a stabilising torque.

Figure 2:
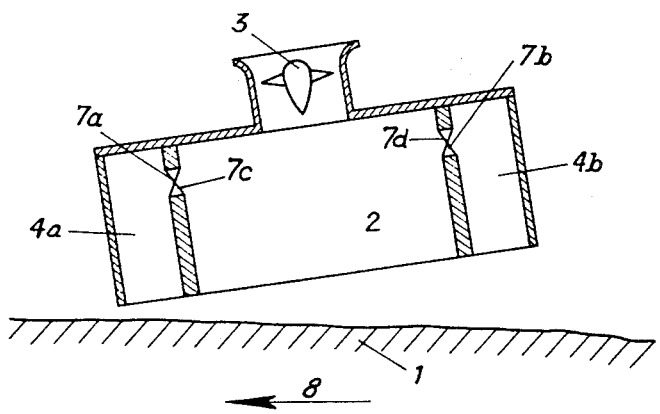

FIGURE 2 shows a lift device similar to the lift device shown in FIGURE 1 except that in FIGURE 2 the outer cushions 4a, 4b are supplied with pressure gas from the central cushion 2 through orifices 7a, 7b fitted with valves 7c, 7d controlling their cross-section. Through the agency of the orifices 7a, 7b, which can be adjusted independently of one another by valves 7c, 7d respectively, the pressure in the cushions 4a, 4b can be controlled as required so that moments which tilt the platform can be produced. In the example shown, the orifice 7b is larger than the orifice 7a and the vehicle moves in the direction indicated by an arrow 8, i.e., towards the side associated with the cushion 4a whose supply rate of flow is less than for the cushion 4b.

Figure 3:
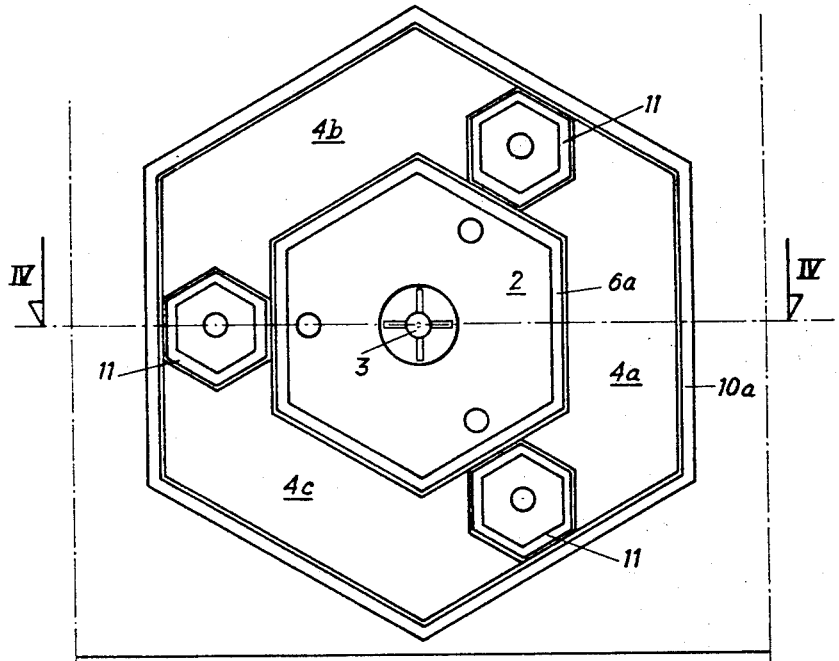
FIGURES 3 and 5 are inverted plan views of two embodiments of the invention.
Figure 4:
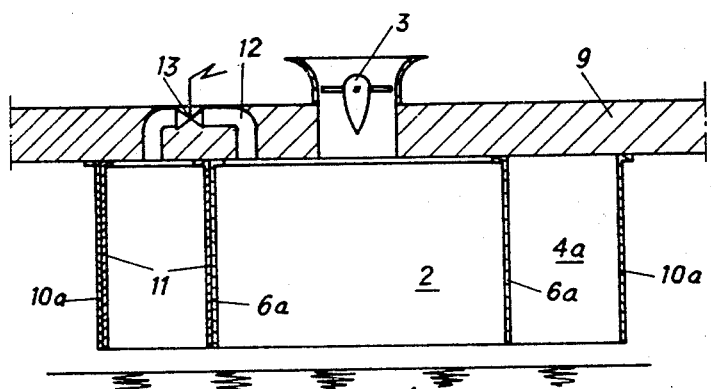
FIGURES 4 and 6 are sections on the lines IV—IV and VI—VI of FIGURES 3 and 5 respectively.

Referring to FIGURES 3 and 4, two endless walls 6a, 10a of polygonal cross-section and prismatic shape are secured to a frame 9, wall 10a extending around wall 6a. The space between the walls 6a and 10a is divided into three compartments 4a, 4b, 4c by three bells 11 which are polygonal in plan and which each have one side touching one side of the wall 6a and a second side touching one side of the wall 10a. The interior of the bells 11 is connected to the interior of the central compartment or cushion 2 via ducts 12 each controlled by valve 13 controllable independently of the other valves. The wall 6a is made of a porous material pervious to the pressure gas supplying the cushion 2. The compartments or cushions 4a, 4b, 4c are supplied with pressure gas from the cushion 2 by the fluid passing through the pores of the wall 6a.

Figure 5:
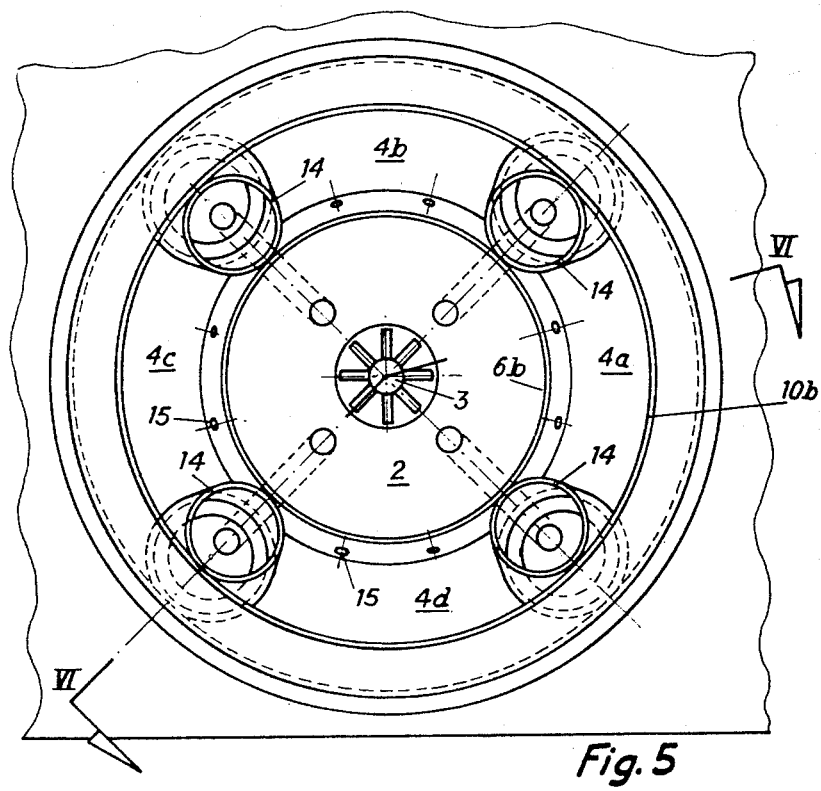
Figure 6:
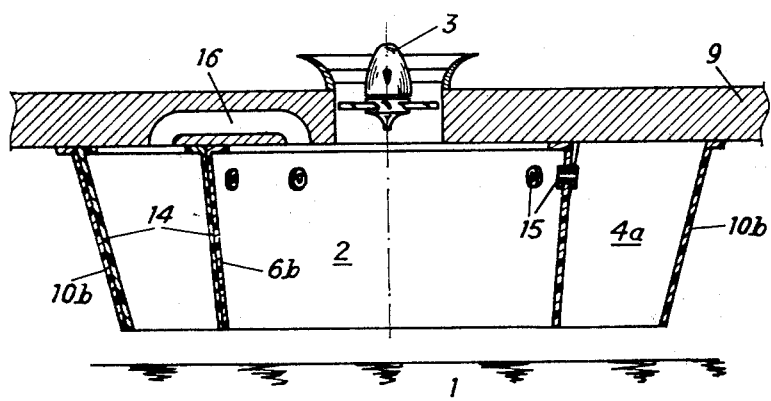

Referring to FIGURES 5 and 6, the corresponding walls 6b, 10b are of circular cross-section and frustoconical shape. In this embodiment the wall 10b is more inclined than the wall 6b. The space between the wall 6b and the wall 10b is divided into four cushion compartments 4a, 4b, 4c, 4d by means of four flexible frusto-conical skirts 14 whose axes are inclined and which are tangential to the wall 6b and to the wall 10b. Orifices 15 in the wall 6a interconnect the central cushion 2 and the various outer cushions 4a, 4b, 4c, 4d. The skirts 14 are supplied with compressed air from the central compartment 2 via ducts 16 in the frame 9, to inflate the skirts 14 and ensure gas-tightness between the various cushions 4a, 4b, 4c, 4d.

In the variant shown in FIGURES 7 and 8, the space between walls 6c and 10c of circular cross-section is divided into three compartments 4a, 4b, 4c by flexible partitions 17 secured to the wall 6c and to the wall 10c. The walls 6c and 10c are in shape cylindrical in the part near the frame 9 and in shape frusto-conical near their free edge, the conicity at the bottom of the outer wall 10c being greater than the conicity of the wall 6c. The cushions 4a, 4b, 4c bounded by the wall 6c, the wall 10c and the partitions 17 are supplied with compressed air from the central cushion through orifices 18 in the top part of the wall 6c.

Referring to FIGURES 9 and 10, the endless walls 6d, 10d are of cylindrical shape, and three partitions 19 divide the annular space between the walls 6d and 10d into three cushions 4a, 4b, 4c. In this example, the bottom edge of wall 10d is nearer the ground 1 than is the bottom edge of wall 6d. The central cushion 2 communicates with the annular cushions 4a, 4b, 4c by way of passages 20 between the frame 9 and the top edge of the first wall 6d, such top edge being, in the zone near the passages 20, locally distant from the frame 9. Partitions 17, 19 are flexible; advantageously, their dimension in plan is greater than the distance to their junction with the endless walls.

Figure 11:
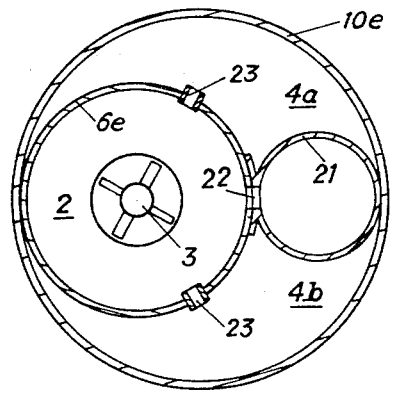
FIGURES 11–13 are diagrammatic views of possible forms for the two endless walls and the means for dividing the space between such walls.

The embodiment shown in FIGURE 11 has three frusto-conical skirts which are tangential to one another. The first skirt 6e forms the endless wall bounding the air cushion 2 which compressor 3 supplies with compressed air. The second skirt 10e forms the second endless wall. The wall 6e is tangential to wall 10e along a generatrix thereof. The space between the walls 6e and 10e is divided into two compartments 4a, 4b by a flexible skirt 21 supplied with compressed air from the first compartment 2 through orifices 22. The compartments 4a, 4b receive compressed air through orifices 23 in wall 6e.

Figure 12:
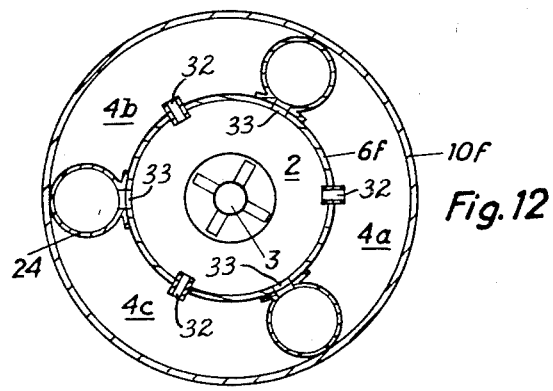

The example shown in FIGURE 12 comprises a first wall 6f of circular cross-section and a second wall 10f which is of circular cross-section and concentric of the first wall 6f; the space between the walls 6f and 10f is divided into three compartments 4a, 4b, 4c by three flexible skirts 24 which are tangential to the wall 6f and to the wall 10f. The compartments 4a, 4b, 4c receive compressed air through ports 32 and the skirts 24 through ports 33 formed in wall 6f.

Figure 13:
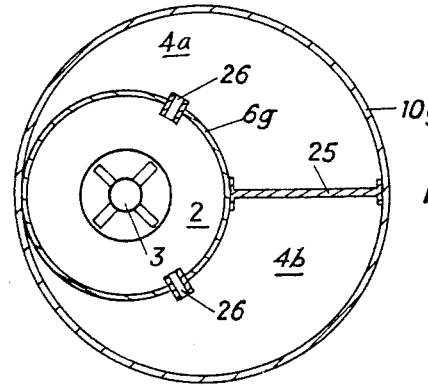

The example shown in FIGURE 13 comprises, like the example shown in FIGURE 11, two endless walls 6g, 10g which are of circular cross-section and which are tangential to one another, the space between the walls 6g and 10g being divided into two compartments by a radial partition 25; the cushions 4a, 4b receive pressure gas from the cushion 2 through orifices 26.

Figure 16:
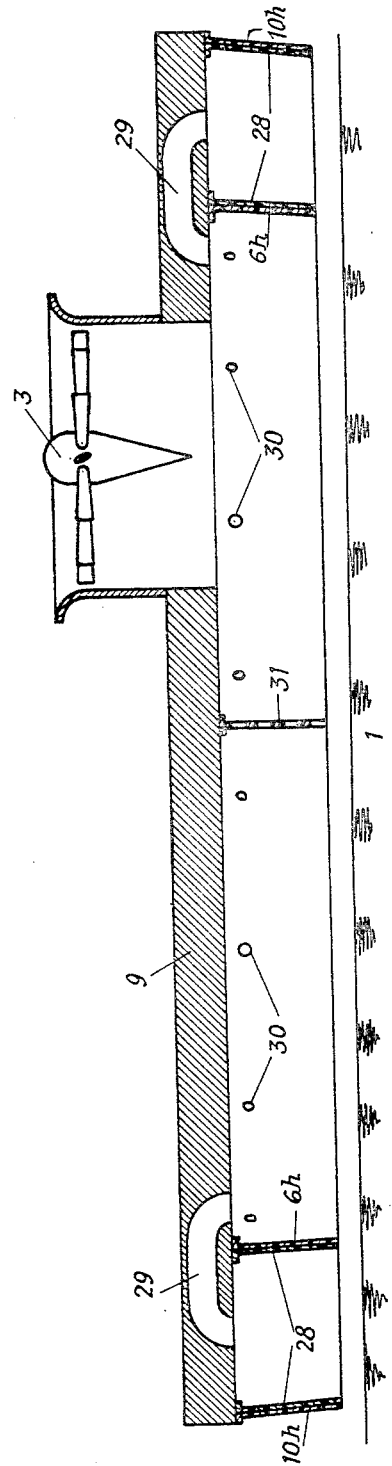
FIGURE 16 is a view to an enlarged scale on the line XVI—XVI on FIGURE 14.

FIGURES 14–16 show a vehicle which is borne above the ground 1 by system comprising six skirts. The first endless wall 6h forms two lobes separated from one another by a pervious wall 31. The outer wall 10h also forms two lobes and extends around the wall 6h. The space between the walls 6h and 10h is divided into four cushions 4a, 4b, 4c, 4d by two partitions 27a, 27b and two skirts 28. One of two lobes formed by wall 6h is supplied by compressor 3 and in turn supplies the other lobe through the pervious wall 31. The interior of the skirts 28 is connected to the inside of the gap bounded by wall 6h through two passages 29, and the four compartments between the walls 6h and 10h are supplied with compressed air from the central compartment through orifices 30 in wall 6h.

The system according to the invention has roll and pitch stability for reason that, when the platform 9 tilts, the pressure in the outer compartment and, where applicable, the skirt which move towards the ground is greater than in the outer compartment and, where applicable, the skirt which move away from the ground, so that a restoring moment is produced.

If the intercommunicating orifices are of variable cross-section, the pressure in the various outer compartments can be controlled as required to produce deliberate pitch and roll moments which tilt the platform. Horizontal control or propulsive forces are thus provided, the vehicle moving, as previously described, in the direction of the lowest-supply compartment.

Preferably, the cushion-bounding walls are flexible so that obstacles can be surmounted readily.

In all the examples described the pressure fluid cushions are bounded at the top by the frame 9 but a top member independent of the frame 9 could of course be provided.

We claim:

1. A ground effect machine cooperating with a bearing surface by way of a plurality of cushions supplied with pressure fluid delivered by a same generator, and comprising in combination:

a first endless wall bounding an inner primary compartment communicating with said generator so as to receive substantially the whole delivery thereof and containing a primary fluid cushion formed against said bearing surface, said first endless wall having a first free edge adjacent said bearing surface and defining therewith a primary daylight clearance for the leakage therethrough of fluid from said primary cushion;

a second endless wall surrounding said first endless wall and cooperating therewith to bound an outer space, said second endless wall having a second free edge adjacent said bearing surface and defining therewith a secondary daylight clearance outwardly spaced from and extending around said primary daylight clearance, whereby primary cushion fluid leaking through said primary daylight clearance is recovered in said outer space before leaking out therefrom through said secondary daylight clearance;

at least one third endless wall extending right across said outer space from said first endless wall to said second endless wall, the outer surface of said third endless wall being in substantially sealing-tight contact with the outer surface of said first endless wall and with the inner surface of said second endless wall, thereby partitioning said outer space into at least two outer secondary compartments; and, communicating means between said inner primary compartment and said outer secondary compartments to supply the latter compartments with pressure fluid from the former compartment in addition to said recovered primary cushion fluid leaking through said primary daylight clearance, whereby said outer secondary compartments contain respective secondary fluid cushions formed against said bearing surface.

2. A machine as set forth in claim 1 wherein said communicating means comprise passages through said first endless wall remote from said free edge thereof.

3. A machine as set forth in claim 1 wherein said third endless wall bounds a pressurizable auxiliary compartment.

4. A machine as set forth in claim 3 further comprising auxiliary communicating means between said inner primary cushion compartment and said auxiliary compartment to supply the latter compartment with pressure fluid from the former compartment.

5. A machine as set forth in claim 1 wherein said first and second and third endless walls each have at least two separate substantially planar surfaces for providing said substantially sealing-tight contact, the corresponding planar surfaces engaging one another.

6. A machine as set forth in claim 5 wherein said endless walls have a polygonal contour in cross-section.

7. A machine as set forth in claim 1 wherein said third endless wall has in cross-section a closed curved shape in tangential contact with said first and second endless walls.

8. A machine as set forth in claim 7 wherein said closed curved shape is substantially circular.

9. A machine as set forth in claim 8 wherein said third endless wall is in substantially frusto-conical shape tapering towards said bearing surface, at least towards its end adjacent said surface.

10. A machine as set forth in claim 1 wherein said third endless wall is made of a flexible material and has in longitudinal section an outline which tapers towards said bearing surface, at least towards its end adjacent said surface.

11. A machine as set forth in claim 1 wherein said first and second endless walls are made of a flexible material and said outer space which they bound has in longitudinal half-section an outline which tapers towards said bearing surface, at least adjacent said free wall edges.

12. A machine as set forth in claim 11 wherein the taper of said second wall is greater than that of said first wall.

13. A machine as set forth in claim 1 wherein portions of said second endless wall are in substantially fluid-tight mutual contact engagement with said first and third endless wall.

14. A machine as set forth in claim 13 wherein said endless walls have in cross-section closed curved shapes and said mutual contact engagement occurs at tangential portions therebetween.

15. A machine as set forth in claim 1 wherein said first endless wall comprises a porous material whose pores form a portion of said communicating means.

16. A machine as set forth in claim 1 further comprising valve means in a portion of said communicating means for controlling the rate of flow of said pressure fluid derived from said inner primary cushion compartment.

17. A machine as set forth in claim 1 wherein said first and second endless walls each comprise at least two distinct joint lobes whose junction points are flexibly interconnected.

References Cited

UNITED STATES PATENTS 3,172,494  3/1965  Cockerell _____ 180—127
3,291,238  12/1966  Eggington _____ 180—128

A. HARRY LEVY, *Primary Examiner.*

U.S. Cl. X.R.

180—128